July 26, 1966 G. J. HUEBNER, JR., ET AL 3,262,674
TURBINE WHEEL
Filed May 27, 1964 3 Sheets-Sheet 1
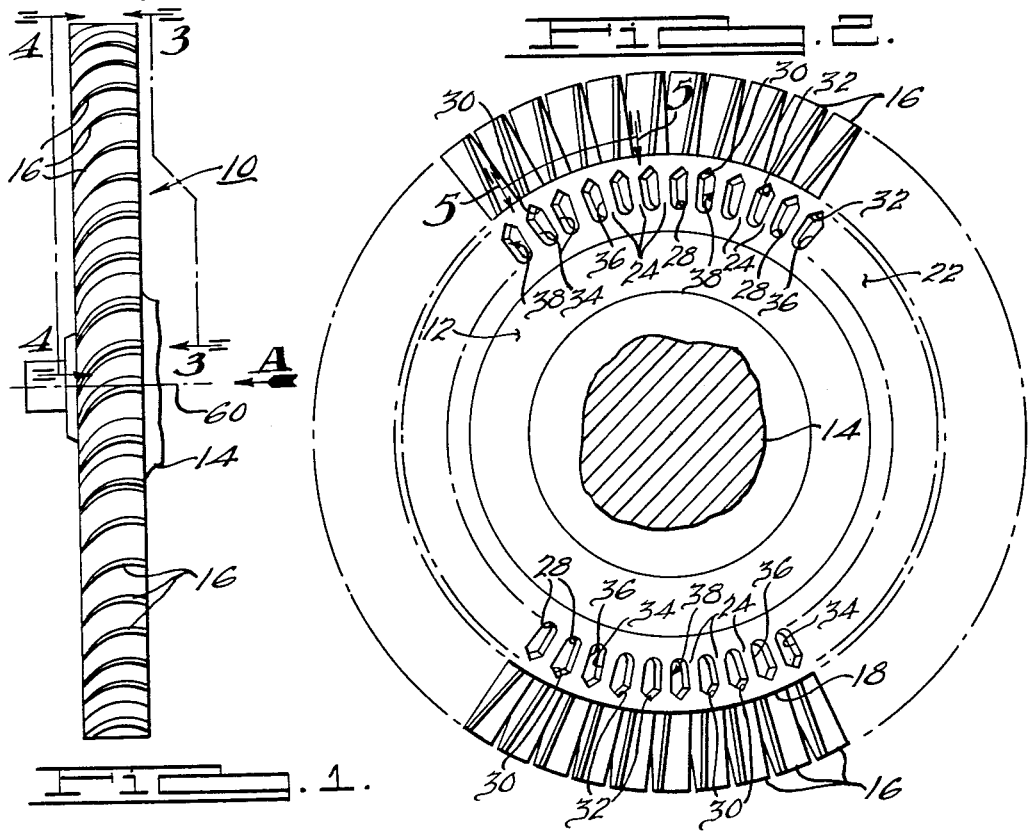
FIG. 1.
FIG. 2.
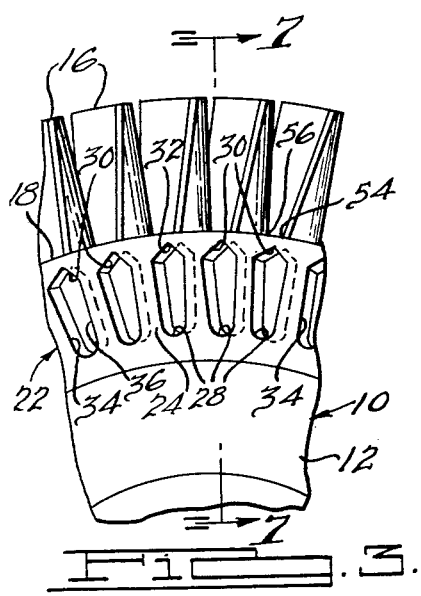
FIG. 3.
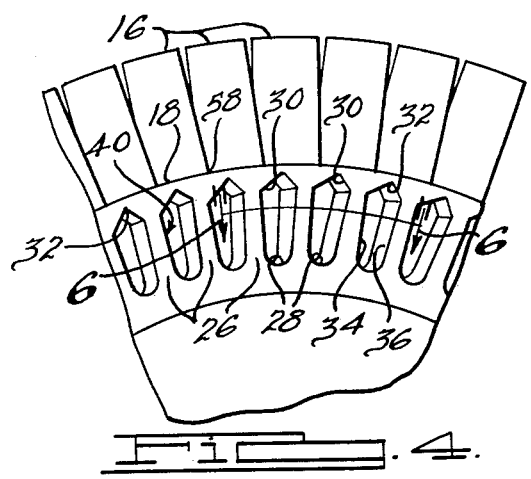
FIG. 4.
INVENTORS.
George J. Huebner, Jr.
Amédée Roy,
John M. Corwin.
BY
Harness and Harris
ATTORNEYS.

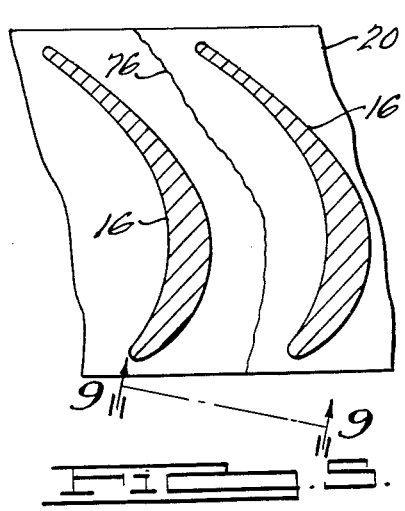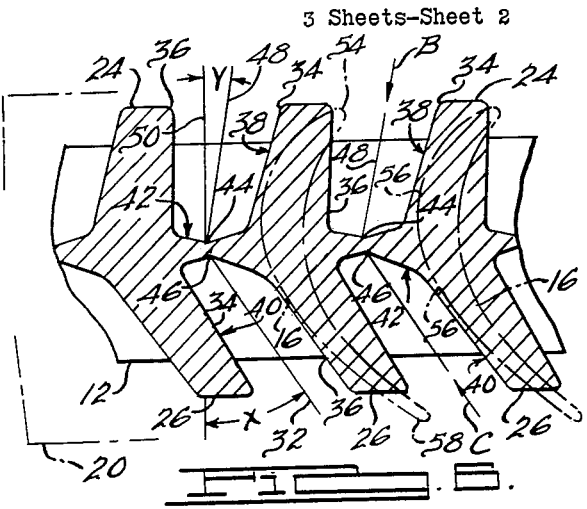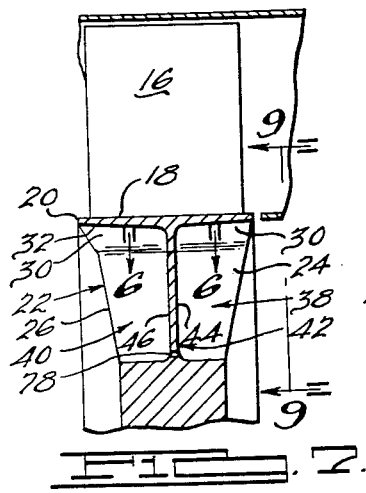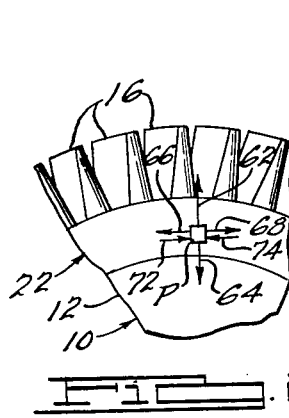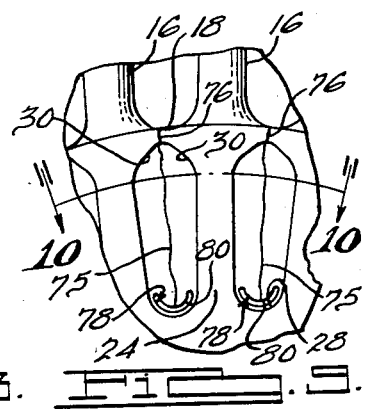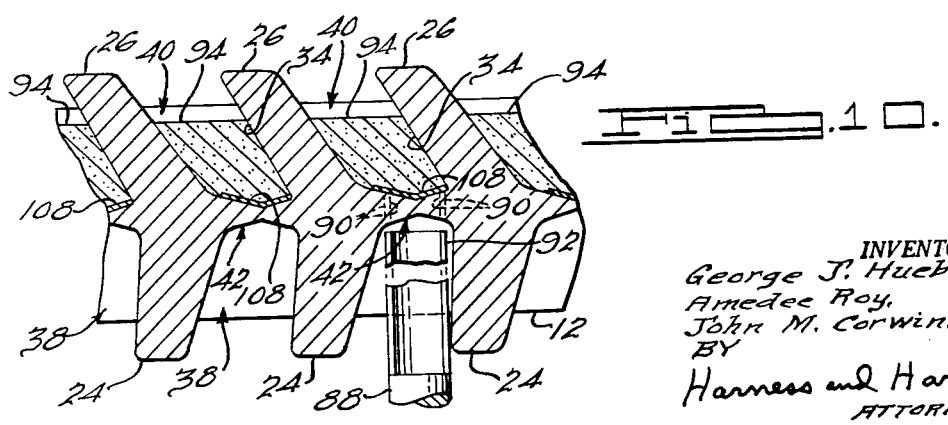
INVENTOR.
George J. Huebner, Jr.,
Amedee Roy,
John M. Corwin.
BY
Harness and Harris
ATTORNEYS.

July 26, 1966 G. J. HUEBNER, JR., ETAL 3,262,674
TURBINE WHEEL
Filed May 27, 1964 3 Sheets-Sheet 3

INVENTORS.
George J. Huebner, Jr.,
Amedee Roy,
John M. Corwin.
BY
Harness and Harris
ATTORNEYS.

United States Patent Office

3,262,674
Patented July 26, 1966

3,262,674
TURBINE WHEEL
George J. Huebner, Jr., Bloomfield Hills, Amedee Roy, Birmingham, and John M. Corwin, Royal Oak, Mich., assignors to Chrysler Corporation, Highland Park, Mich., a corporation of Delaware
Filed May 27, 1964, Ser. No. 370,476
8 Claims. (Cl. 253—77)

This invention relates generally to a gas turbine engine and more particularly to a turbine wheel for use therein.

In the past, turbine wheels have been formed so as to be comprised generally of a disc-like body portion having a rim formed thereon or secured thereto and a plurality of radially directed circumferentially spaced blades formed on or secured to the rim portion. In some instances the disc body has also been provided with a hub portion for securing the wheel to a cooperating shaft.

In every application of a turbine wheel one of the prime considerations is the inertial characteristics of the wheel. That is, in order to assure quick response by the wheel to the motive fluid passing therethrough, precautions are normally taken to reduce the polar moment of inertia of the wheel. This usually is achieved by reducing the mass of the wheel in somewhat a proportion to the radial distance of that mass away from the axis of rotation of the wheel.

In gas turbine engine applications, the turbine wheels experience various stresses during normal engine operation. These stresses can be broadly classified into three general categories the first of which includes mechanical stresses due to the centrifugal force resulting from high speed rotation of the turbine wheel. The second category includes those stresses arising from the vibratory energy induced into the turbine wheel, while the third category of stresses could be referred to generally as thermo-stresses arising from exposure of at least the turbine blades to relatively high heats as that occasioned by the extremely hot motive gases passing therethrough.

Because of these three categories of stresses the mass of the rims and bodies of turbine wheels of the prior art design could not be effectively reduced to the degree desired in order to obtain a high responsive turbine wheel. That is, heretofore it has been considered necessary to have the rim and disc body adjacent the rim of a cross-sectional thickness sufficient to prevent cracking of the turbine wheel due to the stresses developed during operation. The cross-sectional thickness in such instances has in turn caused the general peripheral mass of the wheel to increase to the degree resulting in a considerable increase in the inertia and consequent loss in wheel acceleration response.

Accordingly, an object of this invention is to provide a novel and improved turbine wheel which has a relatively low polar moment of inertia.

Another object of this invention is to provide a turbine wheel of a configuration which effectively eliminates the deleterious effects of thermal stresses normally arising from exposure to relatively hot motive gases.

Still another object of this invention is to provide means in a turbine wheel for effectively reducing or minimizing the occurrence of damaging induced vibratory stresses.

Other objects and advantages of the invention will become apparent when reference is made to the following description and accompanying drawings wherein:

FIGURE 1 is a side elevational view of a turbine wheel constructed in accordance with the teachings of this invention;

FIGURE 2 is an end view of the turbine wheel taken generally in the direction of arrow A of FIGURE 1;

FIGURE 3 is an enlarged fragmentary elevational view taken substantially on line 3—3 of FIGURE 1;

FIGURE 4 is an enlarged fragmentary elevational view taken substantially on line 4—4 of FIGURE 1 and looking in the direction of the arrows;

FIGURE 5 is a fragmentary elevational view taken generally on line 5—5 of FIGURE 2;

FIGURE 6 is an enlarged fragmentary cross-sectional view taken generally on the plane of line 6—6 of FIGURE 4, also illustrated in FIGURE 7, and looking in the direction of the arrows;

FIGURE 7 is an enlarged fragmentary cross-sectional view taken generally axially of the turbine wheel as, for example, on the plane of line 7—7 of FIGURE 3;

FIGURE 8 is a fragmentary view, similar to FIGURE 3, diagrammatically illustrating the forces incurred by an infinitesimal particle of the turbine wheel during periods of operation;

FIGURE 9 is an enlarged fragmentary elevational view of a portion of the turbine wheel taken generally on the plane of lines 9—9 of both FIGURES 5 and 7;

FIGURE 10 is a cross-sectional view, similar to FIGURE 6, taken generally on the plane of line 10—10 of FIGURE 9;

Figure 12:
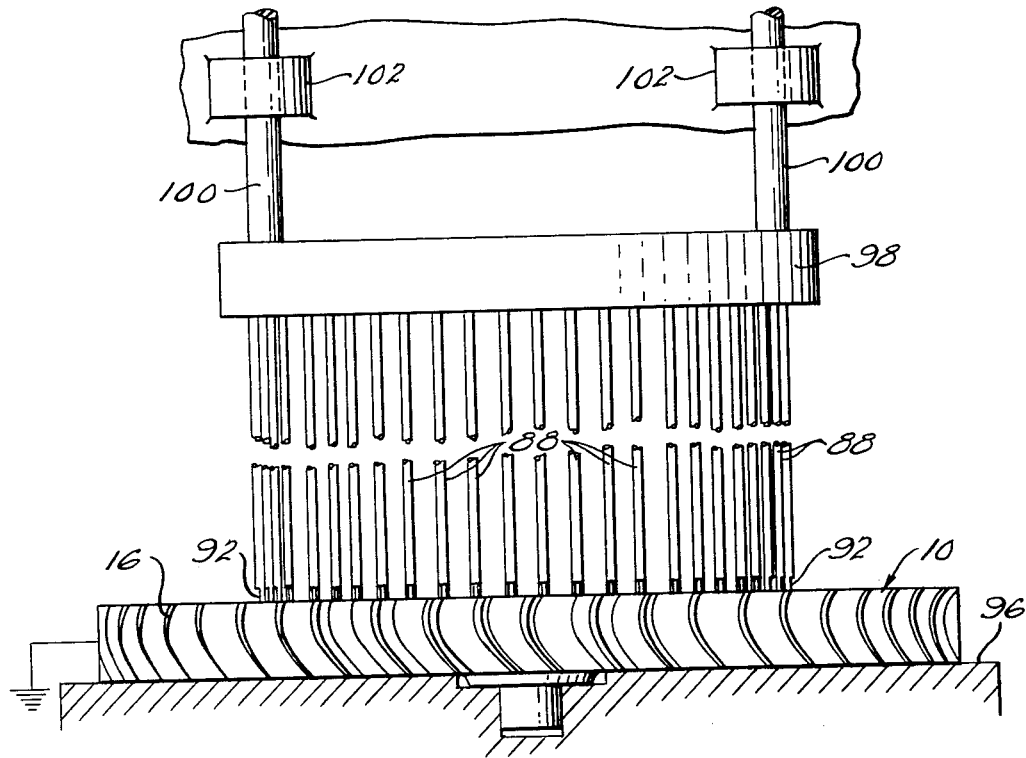
FIGURE 12 illustrates, generally, apparatus suitable for use in forming a turbine wheel in accordance with this invention.

Certain details are omitted from one or more figures for purposes of clarity.

Referring now in greater detail to the drawings, a turbine wheel 10 is illustrated as being comprised generally of a disc-like body 12 provided with a centrally disposed hub portion 14 for mounting the body 12 to a suitable shaft, and a plurality of radially directed circumferentially spaced blades 16 against which a cooperating motive fluid is directed in order to impart rotative motion to the turbine wheel 10 and its associated shaft. Blades 16 are formed as to extend generally radially outwardly from the outer surface 18 of rim 20 which comprises a portion of an annular support or pedestal arrangement 22.

The annular support 22 is comprised of a plurality of generally radially directed circumferentially spaced front and rear struts or ribs 24 and 26, respectively. The terms "front" and "rear" are used to denote the position of the ribs axially of the wheel 10. That is, the front ribs 24 would be on the upstream side of the wheel while the rear ribs 26 would be on the downstream side of the wheel.

Succeeding ribs or struts are joined to each other at their respective radially inner-most ends by a fillet-like arcuate portion 28 as shown generally in FIGURES 2, 3 and 4. The radially outer-most ends of each of the ribs is provided with a tapered portion 30 which tapers outwardly from the rib and joins a similarly tapered portion of the adjacent rib to form an apex or juncture 32 which is generally conterminous with the lower portion of the rim 20.

Surfaces 34 and 36 of adjacent front ribs 24 along with tapered portions 30 and arcuate portions 28 collectively define front recesses 38 which extend inwardly and generally axially of the wheel 10. Similarly, surfaces 34 and 36 of adjacent rear ribs 26 along with associated tapered portions 30 and arcuate portions 28 collectively define rear recesses 40 which also extend inwardly and generally axially of the wheel. As illustrated in FIGURES 6 and 7, the front and rear recesses extend inwardly of the wheel 10 towards each other and are separated by a common thin wall 42.

It should be noted that both recesses 38 and 40 extend inwardly into the wheel 10 at a slight angle with respect to a plane containing the axis of the wheel. For example, a plane passing through the middle of recess 38 will have a trace 48 at an angle Y with respect to trace 50 of the plane passing through the axis of wheel 10. Similarly, a plane passing through the middle of recess 40 will have a trace 52 which is at an angle X with respect to trace 50. In the embodiment disclosed, angle X is greater than angle Y; however, as will become apparent the precise relationship of angles X and Y is not controlling in the practice of the invention.

Both sides of each of the walls 42 are preferably tapered inwardly towards each other so as to form indentations 44 and 46 generally along the wall 42 and radially of the wheel 10. Indentations 44 and 46 are provided in order to define an area of reduced cross-sectional thickness in walls 42 thereby creating an area for stress concentration. In certain of particularly successful embodiments of the invention the thickness of the reduced portion of the walls 42 was in the order of 0.010 to 0.020 inch.

In FIGURE 6 the root profile of a couple of blades 16 is illustrated in phantom line in order to better illustrate the position of the respective blades to the ribs 24 and 26 immediately radially inwardly of the rim 20.

Referring to FIGURES 3, 4 and 6, if recesses 38 are viewed in the direction of arrow B of FIGURE 6, it can be seen that the outer-most end of the respective apexes 32 are substantially midway of the projected distance between root 54 of the front of one of the blades 16 and root 56 of a median portion of the next adjacent blade 16. Similarly, if recesses 40 are viewed in the direction of arrow C of FIGURE 6, it can be seen that the outer-most end of the respective apexes 32 of recesses 40 are substantially midway of the projected distance between root 58 of the rear of one of the blades 16 and the root 56 of the median portion of the next adjacent blade 16.

In FIGURE 6, the forward and rearward ends of the respective blades are shown as projecting some distance beyond ribs 24 and 26. Such ends are, however, fully supported by the respective ribs because, as illustrated, for example, in FIGURES 3, 4 and 5, the ribs are provided with not only tapered portions 30 but also taper outwardly from the axially medial portion of the wheel so as to have the largest width axially of the wheel immediately below the rim 20. FIGURE 6 is a cross-sectional view obtained on lines 6—6 of either FIGURES 4 or 7 somewhat radially inwardly of where tapered portions 30 join surfaces 34 and 36.

Referring to FIGURES 1 and 8, let it be assumed that the wheel 10 is caused to rotate about its axis 60 and that the square, identified as P, is an infinitesimal particle of the wheel. Due to the centrifugal and centripetal forces developed during rotation of wheel 10, particle P experiences tension as illustrated generally by the force vectors 62 and 64. That is, particle P is urged radially outwardly of wheel 10 but at the same time restrained to some degree by the adjoining particles. The greater the angular velocity, the greater, of course, are forces 62 and 64.

With the high rotational speeds experienced by turbine wheels actual radial expansion of the wheel is incurred. Accordingly, it can be appreciated that such radial expansion requires substantially every infinitesimal particle of the wheel to experience slight radially outward movement. Consequently, the infinitesimal particles circumferentially adjoining particle P cause particle P to be placed in a state of generally circumferential or tangential tension as indicated by force vectors 66 and 68.

The forces described above are those resulting from merely rotation of the turbine wheel. However, additional forces are created whenever the wheel 10 is exposed to high heat as, for example, the hot motive gases employed in a gas turbine engine.

Referring to FIGURES 7 and 8, let it be assumed that hot motive gases are being directed through an annular conduit 70 and against blades 16 so as to impart rotative motion to wheel 10. Due to rotation, particle P will, of course, experience forces 62, 64, 66, and 68 as previously described. However, because of the heat transfer incurred as between the hot motive gases, the blades 16 and pedestal structure 22, the forces developed on particle P are somewhat altered.

For example, referring to FIGURES 7 and 2, it should be apparent that a temperature gradient will exist as between generally blades 16 and the hub 14 of wheel 10 due to the relatively cold hub 14 and the hot motive gases impinging against blades 16. Consequently, the radially outer-most portions such as rim 20 and support structure 22 expand to a greater extent than the adjoining radially inner portions of the wheel 10.

Therefore, since portion 12 of wheel 10 prevents rim 20 and support structure 22 from expanding to the degree normally required by the temperature of the rim and support, rim 20 and wall 42 of support 22 are placed in a state of circumferential or tangential compression. If particle P of FIGURE 8 is considered to be a particle of rim 20, for example, it becomes apparent that because of the attempt to expand by the circumferentially adjoining particles and the restraining effect thereon by the relatively cooler portion of the wheel, that particle P is now placed in a condition of circumferential or tangential compression as indicated generally by force vectors 72 and 74 which have replaced vectors 66 and 68. As the temperature gradient increases the compression experienced in the rim 20 becomes sufficient to result in plastic deformation of the rim material. This deformation accommodates, to some degree, the expansion required by the relatively hot radially outer portions of the wheel.

However, upon subsequent cooling of the wheel 10, as occasioned during, for example, engine shut-down or reduced temperature and engine output, a reversal of forces occurs. That is, those sections of the radially outer portion of the wheel 10, such as rim 20, attempt to contract and return to their normal state free of induced stresses. However, such contraction is inhibited because these very same portions have, as discussed above, previously undergone plastic deformation. Consequently, the particles, such as P, which were previously in a state of tangential compression are once more placed in a state of circumferential or tangential tension as illustrated generally by force vectors 66 and 68. These forces in turn cause cracks to occur generally radially of wheel 10 at points of greatest stress concentration.

The problem of thermally induced stresses as described above is well known to the prior art. It has been a commonly accepted belief, by those skilled in the art, that such thermally induced wheel cracks are incompatible to an otherwise properly functioning turbine wheel and that a turbine wheel which developed such cracks could not be further safely employed within an engine. Consequently, the prior art has heretofore proposed various arrangements for strengthening the turbine wheel rim and/or thermally isolating the wheel blades 16 from the supporting rim structure. Such proposed solutions have not, however, proven to be entirely satisfactory.

In the embodiment of the invention disclosed, not only does rim 20 experience the various forces described but so also does the web or wall 42 separating recesses 38 and 40. This invention, contrary to the prior art and contrary to the commonly accepted belief by those skilled in the art, provides an arrangement specifically intended to give rise to the occurrence of such thermally induced cracks.

As previously stated, the cross-sectional thickness from apexes 32 to surface 18 of rim 20 are minimal as are the cross-sectional thicknesses of webs 42 between indentations 44 and 46. Accordingly, as compressive forces are created, due to temperature gradients, plastic deformation, if it is to occur, will exhibit itself to the greatest extent in such sections of reduced cross-sectional area. Subsequently, as wheel 10 cools, during periods of, for example, engine shutdown, reverse tangential tensional forces occur on the infinitesimal particles comprising such sections of reduced cross-sectional area. Consequently, contrary to the prior art, cracks are encouraged to occur through such sections of localized stress. As such cracks occur, they will appear through webs or walls 42 in the vicinity of indentations 44 and 46 so as to assume a generally radial position with respect to the axis 60 of the wheel 10. Further, cracks will also occur generally axially of wheel 10 through rim 20 so as to be in a pattern generally defined by plane traces 48 and 52 of FIGURE 6. An example of such a generally axially directed crack is illustrated at 76 of FIGURE 5.

The radial cracks 75 will, of course, occur in webs 42 at the areas of greatest stress concentration which would, in the embodiment of the invention disclosed, be determined by indentations 44 and 46. Such cracks 75 progress radially inwardly towards the center of wheel 10 to the point where provision is made to limit the further progress of such cracks.

The invention as herein disclosed contemplates the provision of crack barriers in the form of stress dissipating apertures 78 formed through each of the webs or walls 42. The provision of such apertures 78 prevents the propagation of radial cracks 75 beyond a predetermined point on the wheel 10.

As best seen in FIGURES 7 and 9 the stress relieving barrier 78 is an aperture of generally U-shaped or semicircular configuration. It can be appreciated that as crack 75 progresses to where it breaks through the upper or radially outer surface or edge 80 of aperture 78, that the forces tending to propagate crack 75 are dissipated.

In many instances it has been found to be a decided advantage to provide some means which would effectively seal the stress relieving barrier 78 to the passage of gases therethrough and yet not defeat the purpose of the aperture 78. This, it has been discovered, can be quickly and effectively accomplished by the use of, for example, a plasma arc spray process or a flame spray process. It has been found that with either of these processes a metallic layer, as indicated generally at 84 of FIGURE 11, can be deposited generally about and across the aperture 78 in order to form a sealing means. In the preferred embodiment nickel and aluminum would be deposited by either of the above processes to form layers 84 which would be comprised, principally, of NiAl and Ni₃Al.

It should be noted that the layer 84 is applied in a manner which will not allow any crack to be propagated thereacross and into the lower edge or surface 82 of aperture 78. That is, it has been determined that the particles of nickel and aluminum cause a metallurgical bond with wall 42 because of the exothermic reaction of the particles and the heat transferred thereby upon striking the surface of wall 42. It also has been determined that if the accelerated particles of nickel and aluminum are directed against a surface of, for example, wall 42 in a path which forms an angle less than 45° with that surface, the heat transfer to the work piece is usually insufficient to cause a metallurgical bond therebetween.

Figure 11:
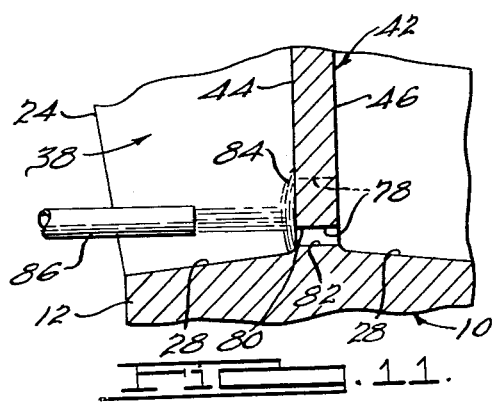
FIGURE 11 is an enlarged fragmentary cross-sectional view illustrating in greater detail a portion of the preferred embodiment of this invention.

Accordingly, the plasma arc or flame spray gun, illustrated schematically at 86 of FIGURE 11, is held with respect to wall 42 so that a metallurgical bond will be effected generally radially outwardly of surface 80. It should be noted from the schematic representation of FIGURE 11 that particles of aluminum and nickel will not bond to the surfaces 80 and 82 defining aperture 78 because the angle of incidence of the accelerated particles is less than sufficient to cause the required metallurgical bonding. This is also true for the surface of fillets 28.

Even though the elongated arcuate stress dissipating apertures 78 can be formed by any suitable process as, for example, by casting, the preferred method of forming such apertures 78 can be best described with reference to FIGURES 10, 12 and 13.

It has been discovered that the elongated arcuate slots or stress barriers 78 can be most expeditiously formed by any of the machining processes often referred to as electrical discharge machining. Although electrical discharge machining is relatively well known in the art the use thereof is employed as one step in a novel method of forming a turbine wheel as disclosed herein.

For example, referring to FIGURE 10, an electrode 88 of a suitable electrical discharge machine is shown being brought into position for the machining or metal removing step of the process. The hidden lines 90 indicate generally the path of the electrode 88 through wall 42. As is well known in the art of electrical discharge machining, the end projection of electrode end 92 is of a configuration and size closely approximating the arcuate opening 78.

In order to prevent damage to surfaces 34 by electrode 88 as it passes through wall 42, cavities of chambers 40 are filled as illustrated with a suitable dielectric material 94. Accordingly, as electrode 88 emerges through wall 42 into cavity 40, the path for spark discharge between the end of electrode 88 and surface 34 is closed by the presence of the dielectric material 94. It has been discovered that wax is a highly suitable dielectric material.

FIGURE 12 illustrates an apparatus whereby all of the arcuate stress barriers 78 can be formed simultaneously. The apparatus is comprised generally of suitable holding fixture 96 for the turbine wheel 10 (workpiece), and a relatively movable electrode holder 98 which may be suitably mounted on posts 100 slidably received within stationary bushings 102.

Figure 13:
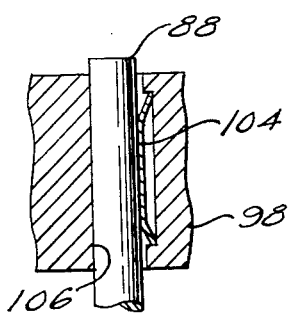
FIGURE 13 is an enlarged fragmentary view, in cross-section, of a portion of the apparatus of FIGURE 12.

Preferably, as illustrated in FIGURE 13, each of the electrodes 88 is provided with frictionally engaging means, such as a spring 104, for retaining the electrodes 88 within the openings 106 of electrode holder 98. The frictional retaining means 104 is such as to at times permit relative motion between the electrode 88 and holder 98. Such relative motion is highly useful, for example, referring to FIGURES 12 and 13, the electrode holder 98 may be lowered until each of the electrodes 88 abuts against its respective wall 42. Any variations in electrode position (axially) will automatically be eliminated (or if such variations are necessary they will be created) by the relative motion between electrodes 88 and holder 98 permitted by the frictional retaining means or spring 104

As is well known in the art of electrical discharge machining, the end of the electrode is usually held relatively close to the workpiece, at a distance of, for example, in the order of 0.001 inch. Accordingly, once the relative axial positions of electrodes 88 are determined the holder 98 may be moved upwardly a selected distance thereby establishing the gap between each of the electrodes and corresponding wall 42, simultaneously.

The electrode holder 98 is then fed downwardly at a controlled rate until all of the electrodes 88 form their respective arcuate apertures 78. If the dielectric material 94 is wax or any other dielectric substance which has sufficient density or body to resist the further axial movement of electrodes 88, then it becomes possible to have electrodes which will not complete their respective apertures 78. That is, because of various reasons, such as the configuration of the workpiece, the possible variations in the thickness of the wall 42, the possible variations in the rate of wear or erosion of the electrode 88 itself, it is quite conceivable and probable that only a portion of an electrode will break through wall 42 and contact the dielectric material 94. Because of the density of the dielectric material 94 and the frictional engagement of the electrode 88 with holder 98, further axial movement of the electrode is prevented. Consequently, the electrode 88 would not complete the arcuate aperture 78 because the dielectric material would continue holding the end of the electrode 88 away from the remaining material to be machined from wall 42 regardless of the movement of electrode holder 98.

In order to avoid this possibility, a relatively thin layer of electrically conductive material 108 is provided generally between the dielectric material 94 and wall 42. It has been discovered that a layer of aluminum foil is highly suitable for this purpose.

It can be seen that through use of such a conductive material the electrode 88 will have to penetrate the layer 108 before coming into contact with the dielectric 94. The extra thickness of conductive material provided by layer 108 assures that the electrode will complete its aperture 78 prior to engaging the dielectric 94.

The invention as disclosed, among other things, provides simple and yet highly effective means for limiting radal crack propagaton in a turbine wheel. Further, the particular crack limiting means is such as to lend itself to a novel method of manufacture which, in turn, greatly reduces the cost of the turbine wheel.

Although only a preferred embodiment of the invention has been disclosed and described, it is apparent that other embodiments and modifications of the invention are possible within the scope of the appended claims.

We claim:
1. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, means for preventing the propagation of said cracks beyond a predetermined point, said means comprising a generally U-shaped aperture formed through said wall generally axially of said wheel.

2. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, means for preventing the propagation of said cracks in said walls beyond a predetermined point, said means comprising a generally axially directed semi-circular arcuate aperture formed through each of said selected walls.

3. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, an arcuate aperture of generally U-shaped configuration formed through each of said selected walls so as to intersect said areas of stress concentration in order to limit the extent to which said cracks may propagate through said areas of stress concentration, each of said arcuate apertures being located so as to be in at least close proximity to said innermost ends of said struts and said disc-like body.

4. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, a generally U-shaped aperture formed through each of said selected walls generally axially of said wheel, and a layer of material bonded to at least a portion of said selected walls and extending across said U-shaped apertures in order to inhibit the passage of gases through said apertures.

5. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, means for preventing the radial propagation of said cracks formed through said areas of stress concentration, said means comprising a generally axially directed arcuate aperture formed through each of said areas of stress concentration, and at least one layer of metallic material bonded to at least a portion of each of said selected walls and extending across said arcuate aperture to inhibit the passage of gases through said arcuate apertures.

6. In a turbine wheel having a disc-like body and a plurality of circumferentialy spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, a generally arcuate aperture formed through each of said areas of stress concentration and extending generally axially of said wheel, and at least one layer of a mixture of nickel and aluminum sprayed against said selected walls forming a closure over each of said apertures, said layer being formed so as to be at least partially metallically bonded to said selected walls.

7. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed struts extending generally axially of said wheel, an annular axially extending rim, said struts being formed so as to be integrally joined with said disc body at their respective radially innermost ends and to be integrally joined to said annular axially extending rim at their respective radially outermost ends, radially directed walls formed integrally with and joining successive spaced struts, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, a generally U-shaped arcuate aperture formed through each of said selected walls for limiting the length of said cracks which may develop in said areas of stress concentration, and metallic sealing means at least partially bonded to said selected walls and respectively spanning each of said U-shaped apertures in order to inhibit the passage of gases through said U-shaped apertures.

8. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs, at least selected ones of said walls being provided with a portion for localizing thermally induced stresses to an area which is generally radially directed so as to cause radiating areas of stress concentration in such selected walls thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient, a generally U-shaped aperture formed in each of said selected walls for limiting the length of said stress dissipating cracks, and metallic sealing means at least partially bonded to said wall and spanning each of said U-shaped apertures in order to inhibit the passage of gases through said apertures, said metallic sealing means being further characterized by its susceptibility to cracking without causing crack propagation in said wall.

References Cited by the Examiner
UNITED STATES PATENTS

| 2,380,276 | 7/1945 | Warren _____ 253—77 |
| 2,460,893 | 2/1949 | MacClutcheon _____ 253—77 |
| 2,472,886 | 6/1949 | Conrad et al. _____ 253—77 |
| 2,660,400 | 11/1953 | Griffith _____ 253—77 |
| 2,772,854 | 12/1956 | Anxionnaz _____ 253—77 |
| 2,888,239 | 5/1959 | Slemmons _____ 253—39 |
| 2,922,619 | 1/1960 | Slemmons _____ 253—77 |
| 3,104,093 | 9/1963 | Craig _____ 253—77 |

FOREIGN PATENTS

| 624,166 | 7/1961 | Canada. |
| 1,256,467 | 2/1961 | France. |
| 652,099 | 4/1951 | Great Britain. |
| 708,836 | 5/1954 | Great Britain. |

MARTIN P. SCHWADRON, *Primary Examiner.*

E. A. POWELL, JR., *Assistant Examiner.*